United States Patent
Nam et al.

(10) Patent No.: US 7,867,437 B2
(45) Date of Patent: Jan. 11, 2011

(54) METHOD OF MANUFACTURE NI-DOPED $TIO_2$ NANOTUBE-SHAPED POWDER AND SHEET FILM COMPRISING THE SAME

(75) Inventors: Woo Hyun Nam, Seoul (KR); Kyung Sub Lee, Seoul (KR); Dong Hyun Kim, Seoul (KR); Sun Jae Kim, Seoul (KR); Nam Hee Lee, Seoul (KR); Hyo Jin Oh, Seoul (KR)

(73) Assignees: Hyundai Motor Company, Seoul (KR); IACG Sejong University, Seoul (KR)

( * ) Notice: Subject to any disclaimer, the term of this patent is extended or adjusted under 35 U.S.C. 154(b) by 113 days.

(21) Appl. No.: 12/006,170

(22) Filed: Dec. 31, 2007

(65) Prior Publication Data

US 2009/0098005 A1    Apr. 16, 2009

(30) Foreign Application Priority Data

Oct. 11, 2007    (KR)    ............ 10-2007-0102468

(51) Int. Cl.
*B22F 7/00*    (2006.01)
*B01J 23/00*    (2006.01)

(52) U.S. Cl. ............ 419/5; 502/337; 502/350

(58) Field of Classification Search ......... 502/337, 502/350; 419/5
See application file for complete search history.

(56) References Cited

U.S. PATENT DOCUMENTS

| | | | |
|---|---|---|---|
| 3,918,138 A * | 11/1975 | Nemeth et al. | 75/237 |
| 4,233,183 A * | 11/1980 | Inaba et al. | 502/202 |
| 4,912,077 A * | 3/1990 | Lachman et al. | 502/302 |
| 5,036,038 A * | 7/1991 | Muan et al. | 502/335 |
| 5,508,116 A * | 4/1996 | Barrett | 428/567 |
| 5,518,683 A * | 5/1996 | Taylor et al. | 419/9 |
| 5,574,959 A * | 11/1996 | Tsujioka et al. | 419/2 |
| 6,191,067 B1 * | 2/2001 | Koike et al. | 502/350 |

(Continued)

FOREIGN PATENT DOCUMENTS

JP    2003-238157    8/2003

(Continued)

OTHER PUBLICATIONS

KuanXin et al.; "Preparation and electrochemical capacitance of Me double hydroxides (Me=Co and Ni)/$TiO_2$ nanotube composites electrode"; *Electrochimica Acta* 51 (2006); pp. 1289-1292.

(Continued)

*Primary Examiner*—Cam N Nguyen
(74) *Attorney, Agent, or Firm*—Edwards Angell Palmer & Dodge LLP; Peter F. Corless

(57) ABSTRACT

The present invention provides a method of manufacturing Ni-doped $TiO_2$ nanotube-shaped powder and a method of manufacturing a sheet film to be inserted into a high-pressure hydrogen tank for a fuel cell vehicle by mixing the Ni-doped $TiO_2$ nanotube-shaped powder with a binder and compressing the mixture. The method of manufacturing Ni-doped $TiO_2$ nanotube-shaped powder includes: forming Ni-doped $TiO_2$ nanotube-shaped powder using Ni-doped $TiO_2$ powder as a starting material; and drying the Ni-doped $TiO_2$ nanotube-shaped powder in the temperature range of 60 to 200° C. for 2 to 24 hours.

5 Claims, 7 Drawing Sheets

U.S. PATENT DOCUMENTS

| | | | | |
|---|---|---|---|---|
| 6,582,651 B1* | 6/2003 | Cochran et al. | | 419/5 |
| 6,911,414 B2* | 6/2005 | Kimura et al. | | 502/349 |
| 7,153,808 B2* | 12/2006 | Iwamoto et al. | | 502/200 |
| 7,211,542 B2* | 5/2007 | Baker et al. | | 502/330 |
| 7,408,086 B2* | 8/2008 | Vanoppen et al. | | 564/422 |
| 7,452,842 B2* | 11/2008 | Wakatsuki et al. | | 502/326 |
| 7,498,289 B2* | 3/2009 | Liu | | 502/335 |
| 7,521,394 B2* | 4/2009 | Xie et al. | | 502/350 |
| 7,541,012 B2* | 6/2009 | Yeung et al. | | 423/245.1 |
| 7,566,415 B2* | 7/2009 | Moxson et al. | | 419/48 |
| 7,572,427 B2* | 8/2009 | Nagy et al. | | 423/447.3 |
| 7,601,670 B2* | 10/2009 | Yasuda et al. | | 502/326 |
| 2004/0161608 A1* | 8/2004 | Choi et al. | | 428/404 |
| 2005/0224360 A1* | 10/2005 | Varghese et al. | | 205/171 |
| 2005/0271892 A1* | 12/2005 | Ogata et al. | | 428/632 |
| 2006/0099409 A1* | 5/2006 | Choi et al. | | 428/336 |
| 2006/0177659 A1* | 8/2006 | Chen et al. | | 428/403 |
| 2008/0134936 A1* | 6/2008 | Kamikoriyama et al. | | 106/31.92 |
| 2008/0206562 A1* | 8/2008 | Stucky et al. | | 428/403 |
| 2008/0312070 A1* | 12/2008 | Talbot et al. | | 502/80 |
| 2009/0008258 A1* | 1/2009 | Rei et al. | | 205/177 |
| 2009/0175757 A1* | 7/2009 | Yao et al. | | 422/4 |
| 2009/0221421 A1* | 9/2009 | Sagou et al. | | 502/242 |
| 2010/0015002 A1* | 1/2010 | Barrera et al. | | 419/11 |
| 2010/0028714 A1* | 2/2010 | Palumbo et al. | | 428/650 |

FOREIGN PATENT DOCUMENTS

| | | |
|---|---|---|
| JP | 2006-044992 | 2/2006 |
| JP | 2006-089307 | 4/2006 |
| KR | 10-2005-0101985 A | 10/2005 |

OTHER PUBLICATIONS

Jiang et al.; "Synthesis, characterization and properties of novel nanostructures consisiting of Ni/titanate and Ni/titania"; *Materials Letters* 60 (2006); pp. 3803-3808.

* cited by examiner

METHOD OF MANUFACTURE NI-DOPED TIO$_2$ NANOTUBE-SHAPED POWDER AND SHEET FILM COMPRISING THE SAME

CROSS-REFERENCE TO RELATED APPLICATION

This application claims under 35 U.S.C. §119(a) on Korean Patent Application No. 10-2007-0102468, filed on Oct. 11, 2007, the entire contents of which are incorporated herein by reference.

BACKGROUND (a) Technical Field

The present invention relates to a method of manufacturing Ni-doped TiO$_2$ (titanate) nanotube-shaped powder and a method of manufacturing a sheet film for a high-pressure hydrogen tank for a fuel cell vehicle using the same. More particularly, the present invention relates to a method of manufacturing Ni-doped TiO$_2$ nanotube-shaped powder capable of storing a greater amount of hydrogen, and a method of manufacturing a sheet film to be inserted into a high-pressure hydrogen tank for a fuel cell vehicle by mixing the Ni-doped TiO$_2$ nanotube-shaped powder with a binder and compressing the mixture.

(b) Background Art

In the recent years, the international situation concerning energy has undergone a sudden change. Especially, as energy problems are associated with environmental problems and strengthened, international environmental regulations including greenhouse gas emission reduction becomes more stringent from the recognition that the structure of energy consumption based on fossil fuels generally causes environmental contamination including global warming.

With the rapid expansion of alternative energy development over the strengthening of environmental regulations and the high oil prices, the energy industry has broken from its smokestack-industry image and created international high-technology competition.

Accordingly, the development of a hybrid material using hydrogen energy for the purpose of developing a material capable of improving energy efficiency and providing ultra-clean energy is an essential task affecting the very existence of the nation and an essential selection for the development of energy resource technology.

Although extensive research aimed at storing hydrogen which is the next generation energy source has continued to progress throughout the world, the exact reaction mechanism of hydrogen storage has not yet been established.

Moreover, the difficulties in reducing the weight of material and realizing practical reaction temperature and pressure and the problem of safety have not been solved.

Meanwhile, although titanate nanotubes were synthesized in 1998, since the results of the study on structural characteristics and phase were not given at that time, the titanate nanotubes were called TiO$_2$ nanotubes.

Recently, the TiO$_2$ nanotubes are prepared by forming a template using porous alumina (Al$_2$O$_3$) and synthesizing TiO$_2$ in its pores.

Such a method is called a template method, in which aluminas or organic materials formed by alumina are used as the template. With the template method, it is possible to manufacture nanotubes having a relatively uniform direction compared with other methods.

However, the template method has some drawbacks in that the diameter of the nanotubes is relatively large, a high cost is required for removing the templates, and impurities remain.

To overcome such drawbacks, a method of synthesizing TiO$_2$ of anatase phase by coating TiF$_4$ on nanochannels of a porous alumina membrane has been proposed. That is, oversaturated Ti is coated on the inside surface of alumina using a characteristic in which TiF$_4$ in an acidic state is bonded to a hydroxyl group (—OH).

Since such a method does not require a heat treatment, the shape is not deformed; however, the process is complicated.

The first method which does not use the template is a method of manufacturing titanate nanotubes by doping a small amount of SiO$_2$, instead of using pure TiO$_2$ powder, to form TiO$_2$ in the form of nanotubes and removing the SiO$_2$.

According to the above method, a mixed solution of TiO$_2$ and SiO$_2$ in the ratio of 8:2 is mixed with ethanol and an HCl solution to form gel in an incubator, the thus formed gel is heat treated to form anatase powder, and the powder is immersed in an alkali solution and washed, thus preparing titanate nanotubes.

However, although it is possible to prepare nanotubes having a length of about 100 nm and a diameter of about 8 nm by the above method, it has also some drawbacks in that the SiO$_2$ should be removed and the activity of a photocatalyst is reduced due to the doped SiO$_2$.

Especially, a strategic study has been carried out by DOE of USA since a hydrogen storage method using carbon nanotubes (CNT) was attempted by Bethune et al. of IBM Corp., USA in 1997; however, they have been faced with limitations and a discussion of whether or not to continue the study has continued.

The CNT can be manufactured by various methods such as arc-discharge, laser vaporization, plasma enhanced CVD, thermal chemical vapor deposition, and the like; however, it has some drawbacks in that its reproductivity is poor according to the methods, the hydrogen stored in the CNT is spontaneously desorbed due to unstable physical absorption between the carbon surface and hydrogen molecules at room temperature and at high temperature, and it requires an extremely low temperature condition since the hydrogen is physically absorbed.

However, in the event that the titanate nanotubes are annealed under vacuum or under a hydrogen atmosphere, n-type rutile or hypostoichiometric phase Ti$_n$O$_{2n-1}$ is formed.

Such phases are used as very important catalysts and, especially, it is reported that the diffusion rate of hydrogen through c-axis is greater than the hydrogen diffusion coefficient D=2*10$^{-8}$ cm$^2$S$^{-1}$ at 400° C. of Ti isotope.

Moreover, in case of the titanate nanotubes, the physical absorption which is the most significant weak point of the CNT is improved and thus the hydrogen storage is available physically and chemically. Accordingly, the titanate nanotubes can be developed as a promising alternative material for storing hydrogen and have advantages in that the manufacturing cost is low, mass production is available, and thus their industrial application is high.

Generally, in order to store much more hydrogen, a greater number of sites for storing hydrogen, an increase in surface area capable of reacting with a greater amount of hydrogen at a time, and a high reactivity with hydrogen should be taken into consideration.

Accordingly, the possibility of the titanate nanotubes as a good hydrogen storage material is expected due to ultra-long nanochannels capable of storing hydrogen molecules and a high specific surface area.

Meanwhile, a research on a metal hydride high pressure hydrogen storage tank, into which Ti—Cr—Mn is inserted, capable of storing hydrogen of about 2.2 wt % at 35 MPa has been carried out by Toyota Japan.

However, Ti—Cr—Mn is a typical $AB_2$ type metal hydride and has some drawbacks in that its reproductivity is poor in preparing powder, it is difficult to stably supply a large amount of alloy of stable quality, segregation and impurities may be incorporated in dissolving the alloy, an initial activation temperature is high, and the storage amount is sensitively changed by the Cr content.

Moreover, in the event that the metal hydride powder is compressed and inserted into the tank, a hydrogen storage reaction hardly occurs on the surface of the compressed powder to reduce the actual amount of hydrogen stored, and it causes a safety problem since it requires a very high pressure for the operation.

The information disclosed in this Background section is only for enhancement of understanding of the background of the invention and should not be taken as an acknowledgement or any form of suggestion that this information forms the prior art that is already known to a person skilled in the art.

SUMMARY OF THE DISCLOSURE

Accordingly, the present invention has been made in an effort to solve the above-described drawbacks. In one aspect, the present invention provides a method of manufacturing Ni-doped $TiO_2$ nanotubes by a hydrothermal synthesis method, in which nickel is doped by a mechanical alloying process using $TiO_2$ powder having a rutile phase as a starting material, the Ni-doped $TiO_2$ nanotubes having increased specific surface area and catalyst characteristics and being used in hydrogen storage, and a method of manufacturing a sheet film to be inserted into a high-pressure hydrogen tank for a fuel cell vehicle by mixing the Ni-doped TiO2 nanotubes with a binder and compressing the mixture.

In order to accomplish the above objects, one embodiment of the present invention provides a method of manufacturing Ni-doped $TiO_2$ nanotube-shaped powder, the method comprising: forming Ni-doped $TiO_2$ nanotube-shaped powder using Ni-doped $TiN_2$ powder as a starting material; and drying the Ni-doped $TiO_2$ nanotube-shaped powder in the temperature range of 60 to 200° C. for 2 to 24 hours.

In a preferred embodiment, the Ni-doped $TiO_2$ powder is formed by adding nickel in the range of 1 to 8 wt % to titanium hydroxide to be mixed with each other.

Preferably, the process of forming Ni-doped $TiO_2$ nanotube-shaped powder comprises: adding the Ni-doped $TiO_2$ powder to a NaOH solution or other metal hydroxides; heat treating the NaOH mixture in an autoclave in the temperature range of 120 to 180° C. for 24 to 72 hours; washing the resultant with an HCl solution and distilled water; and collecting Ni-doped $TiO_2$ nanotube-shaped powder.

In another aspect, present invention provides a method of manufacturing a sheet film to be inserted into a high pressure hydrogen storage tank using the above-described Ni-doped $TiO_2$ nanotube-shaped powder. The method comprises: mixing an above-described Ni-doped $TiO_2$ nanotube-shaped powder with a binder (e.g, Teflon); and compressing the Ni-doped $TiO_2$ nanotube-shaped powder mixed with the binder using a compressor to form a sheet film.

DETAILED DESCRIPTION

Figure 1:
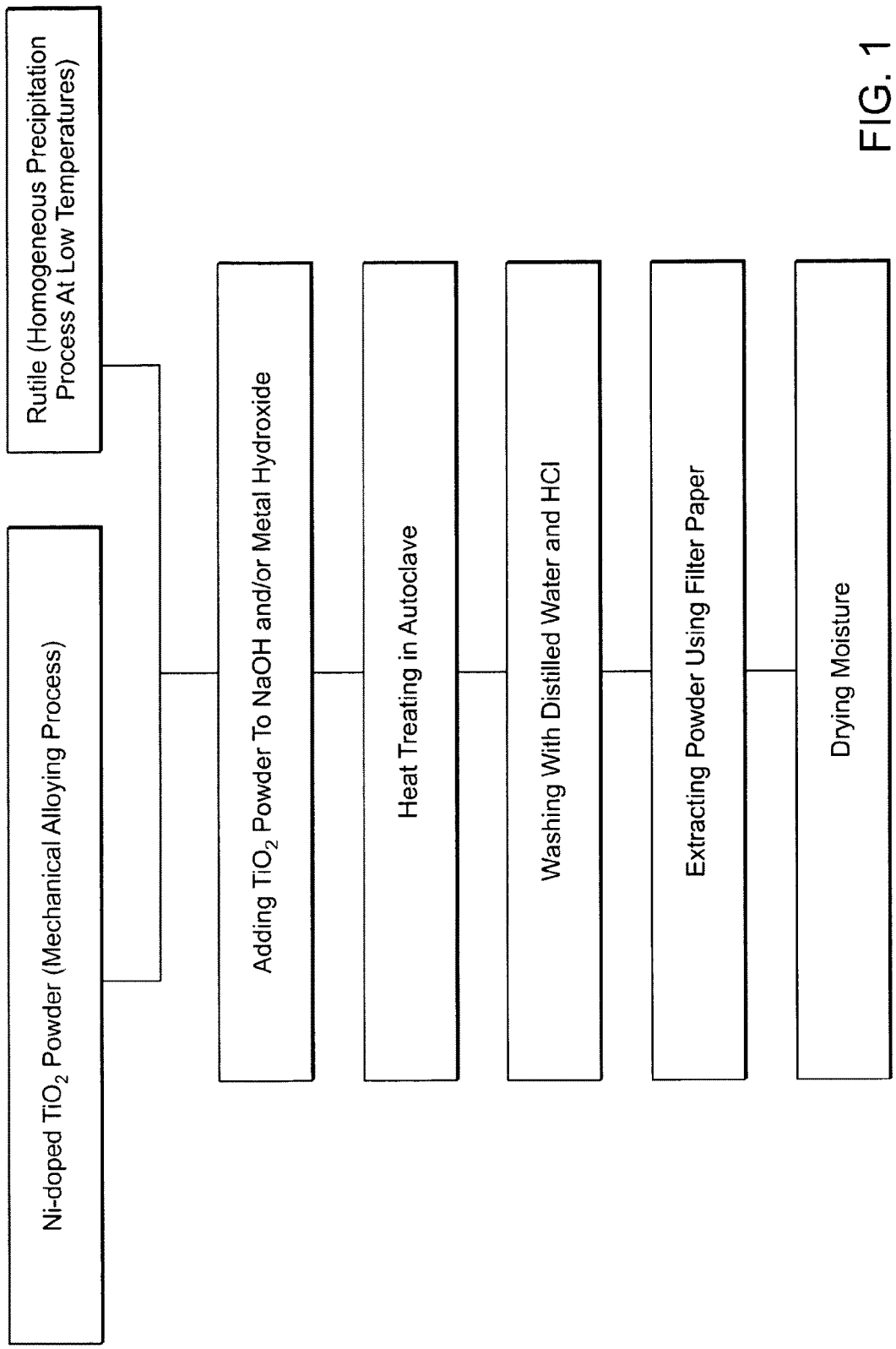
FIG. 1 is a flowchart illustrating a method of manufacturing Ni-doped $TiO_2$ nanotube-shaped powder in accordance with a preferred embodiment of the present invention.
Figure 2:
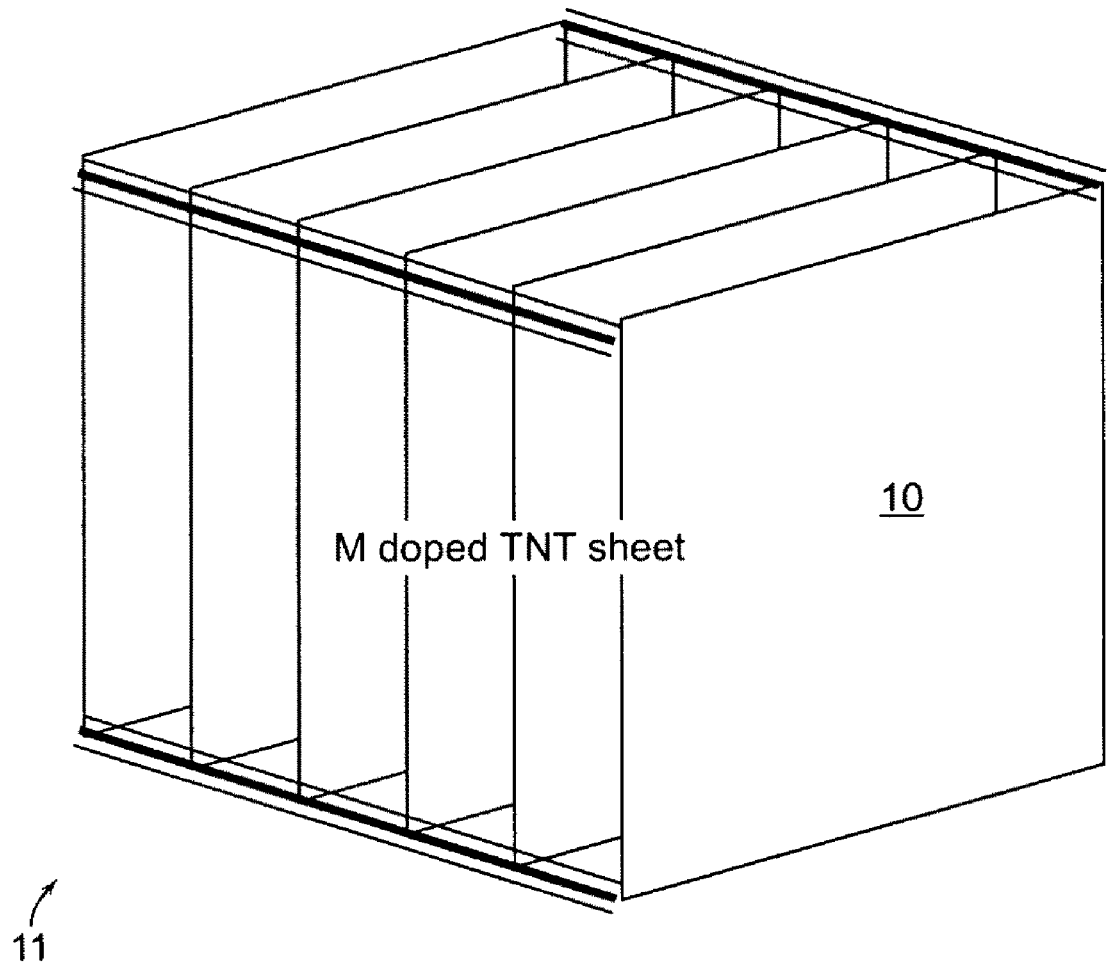
FIG. 2 is a schematic diagram of a sheet film to be inserted into a high-pressure hydrogen tank in accordance with a preferred embodiment of the present invention.

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

FIGS. 1 to 6 are diagrams illustrating a method of manufacturing Ni-doped $TiO_2$ nanotube-shaped powder in accordance with a preferred embodiment of the present invention and a method of manufacturing a sheet film to be inserted into a high pressure hydrogen storage tank for a fuel cell vehicle using the same.

The present invention provides nanotube-shaped powder doped with nickel of more than 4 wt % and having an inner diameter of less than 7 nm, an outer diameter of less than 12 nm and an interlayer distance of more than 0.75 nm.

In a preferred embodiment of the present invention, the nanotube-shaped powder are represented as $A_2Ti_2O_5 \cdot H_2O$, $A_2Ti_3O_7$, and $H_2TiO \cdot H_2O$, wherein A represents H or Na. This is called Ni-doped titanate nanotube (Ni-doped TNT), wherein Ni is a metal in the range of 1 to 8 wt %.

If the content of nickel is less than 1 wt %, it is impossible to obtain the effect of hydrogen storage catalyst by doping, whereas if it exceeds 8 wt %, nickel is precipitated. Accordingly, it is preferable to dope nickel in the range of 1 to 8 wt %.

The preferred embodiment of the present invention is based on Korean Patent Application Nos. 2006-0094390 and 2006-0130457 and relates to a method of manufacturing Ni-doped titanate nanotube-shaped powder, in which 1 to 8 wt % of nickel is doped by a mechanical alloying process using ceramic bowls and balls (Korean Patent No. 10-0576375) to prepare Ni-doped titanate nanotube-shaped powder by a hydrothermal synthesis method and the thus prepared powder is dried in the temperature range of 60 to 200° C. for 2 to 24 hours to completely remove the moisture (firing step), thus obtaining Ni-doped titanate nanotubes.

If the temperature for drying the powder is less than 60° C., the moisture content is high and thus the hydrogen storage site is reduced by hydrate, thus not facilitating the hydrogen storage; whereas if the temperature exceeds 200° C., the shape of the nanotubes may be changed. Accordingly, it is preferable that the temperature be in the range of 60 to 200° C. Moreover, if the drying time is less than 2 hours, the drying effect is insufficient and thus the moisture content is high, whereas if it exceeds 24 hours, it is not easy to collect the powder. Accordingly, it is preferable that the drying time be in the range of 2 to 24 hours.

The formation of the powder includes adding the powder to a NaOH solution of 10 M, heat treating the powder in an autoclave in the temperature range of 120 to 180° C. for 24 hours, washing the resulting powder with an HCl solution of 0.1 M and distilled water, and drying the washed powder. Preferably, the molality of NaOH solution is in the range of 3 to 15 M, and the maintenance temperature of the autoclave is in the range of 120 to 240° C.

Moreover, it is preferable that the powder be washed with an HCl solution having a molality in the range of 0.1 to 5 M in the washing step after the treatment of NaOH solution, rewashed with distilled water for more than one and a half hours, passed through a filter paper to collect the powder, and dried in the temperature range of 60 to 200° C. for 2 to 24 hours.

Furthermore, the powder after the firing step is mixed with a binder (e.g., Teflon) and compressed using a compressor to form a sheet film 10. The thus formed sheet films are connected by a metal pin 11 and inserted into a hydrogen storage tank.

More preferably, a binder of 0.25 to 0.5 ml with respect to the powder is added and a pressure of 1000 to 25000 kg/mm$^2$ is applied thereto to form the sheet film 10.

Next, the present invention will be described in more detail with reference to an Example, but the scope of the present invention should not be limited to the Example.

EXAMPLE

Titanium tetrachloride (TiCl$_4$: under the trade name "3N" manufactured by Aldrich Chemical Co. Inc.) was mixed with ice water to prepare an aqueous titanyl chloride solution of 1.5 M by a homogeneous precipitation process at low temperatures. Subsequently, the aqueous titanyl chloride solution was mixed with distilled water to be diluted to 0.67 M.

The resulting solution was maintained at about 100° C. for 2 hours to form a precipitate of titanium hydroxide. The resulting solution was filtered by a filter paper to collect the precipitate and the thus collected precipitate was dried in an oven at about 60° C. for six hours, thus obtaining titanium hydroxide in a metastable state.

Nickel of 8 wt % was added to the titanium hydroxide to be mixed with each other in a glove box and subjected to a ball milling process in a planetary ball mill (Fritsch P-5) at about 150 rpm for 14 hours. The balls and bowls used were of a zirconium oxide material, in which the balls having a diameter of 1 mm and two 40 cc bowls were used. The weight ratio of balls to mixed powder was 15:1. Such ball milling conditions were given to obtain a doping effect, not a simple mixture.

The thus obtained powder after the ball milling process was added as a starting material to a NaOH solution of 10 M, maintained in an autoclave at about 120° C. for 12 hours, washed using an HCl solution of 0.1 M and distilled water, and filtered using a filter paper to collect the resulting powder. The thus collected powder was heat treated at about 150° C. for 12 hours to remove the moisture in the powder.

Figure 3A:
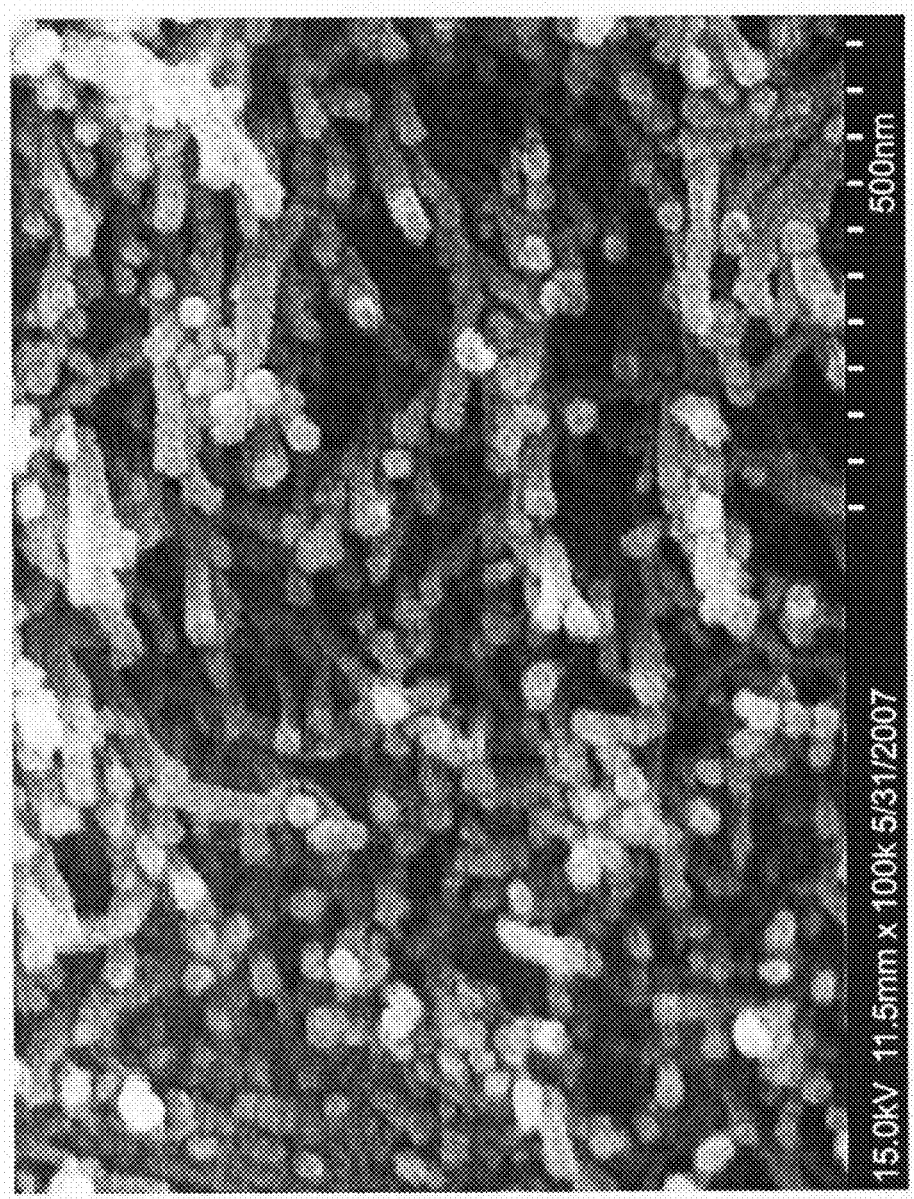
FIGS. 3A and 3B are scanning electron microscope (SEM) photographs of transition-metal-doped nanotube-shaped powders prepared in accordance with a preferred embodiment of the present invention.
Figure 3B:

The thus obtained powder after the above processes was examined using a transmission electron microscope (TEM) and the particle size and distribution were taken by a scanning electron microscope (SEM) as shown in FIGS. 3A and 3B. Moreover, the hydrogen storage capacities at 10, 20 and 30 atmospheric pressure were investigated using a pressure cycling technology (PCT).

Figure 4:
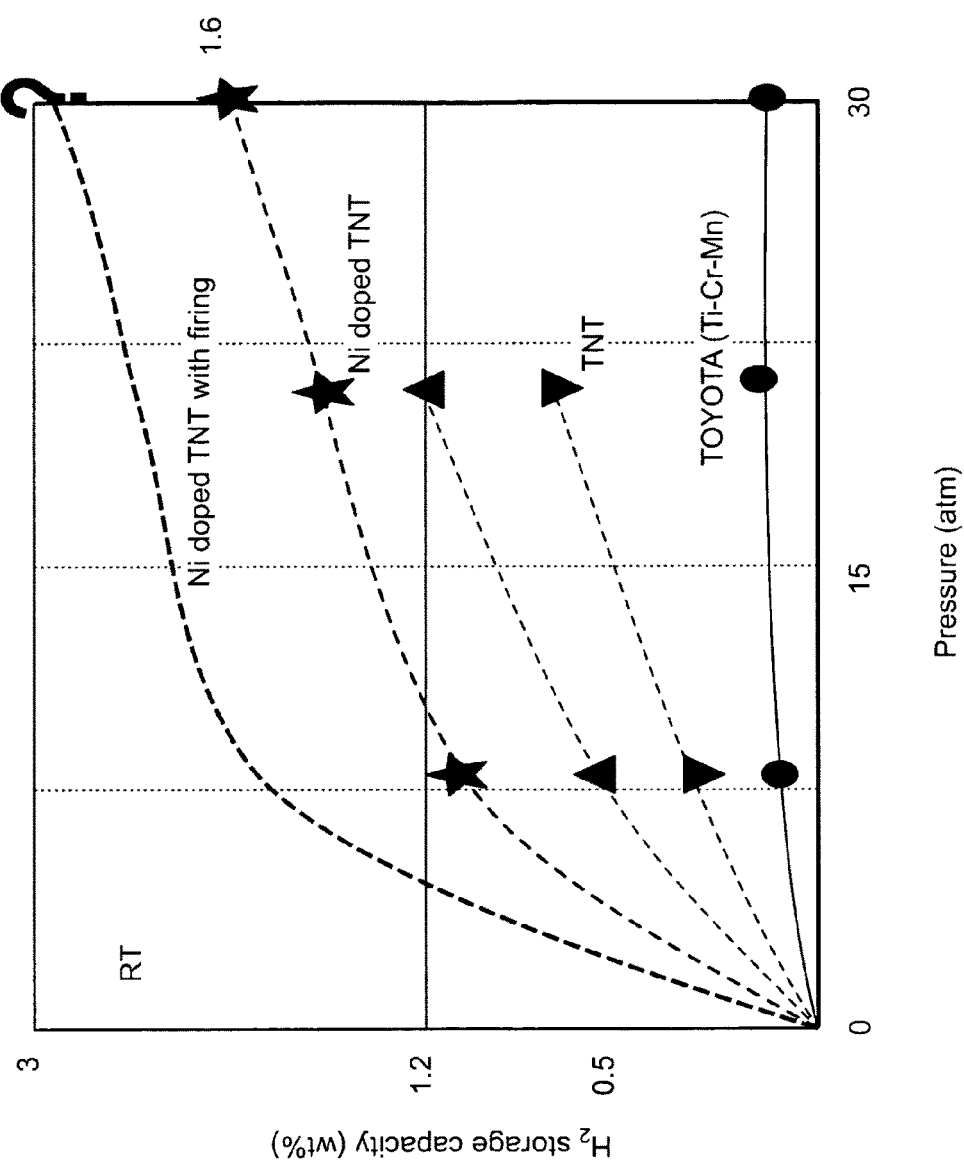
FIG. 4 is a graph showing the experimental results of the present invention, in which hydrogen storage capacities with respect to pressures are shown.
Figure 5:
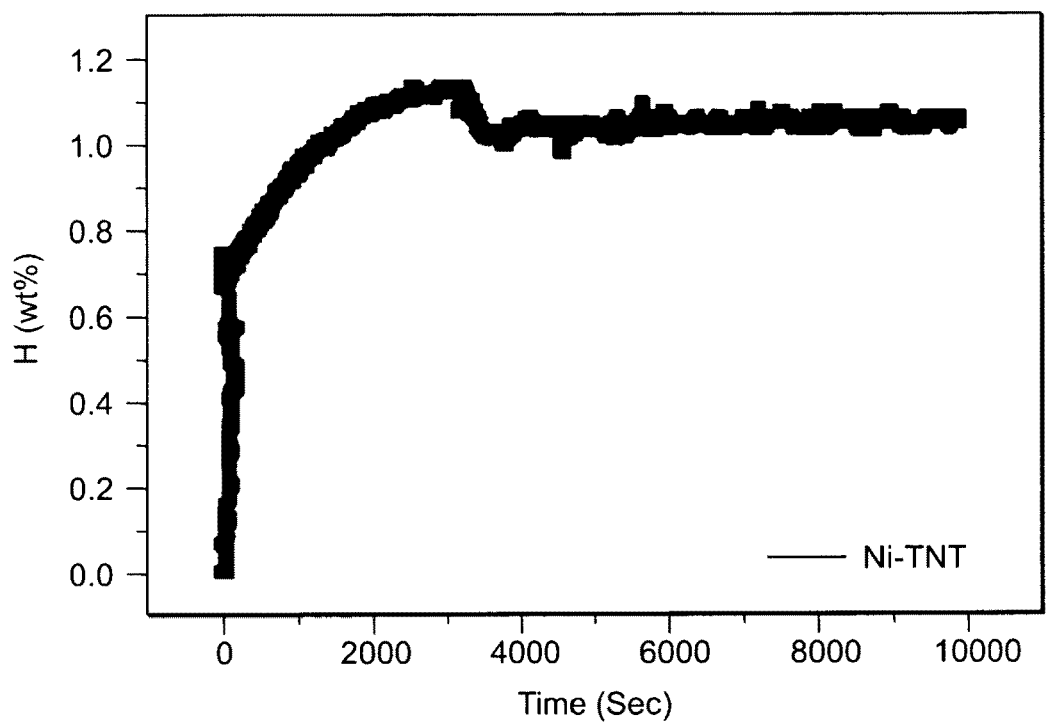
FIG. 5 is a graph showing the experimental results of hydrogen storage after drying the transition-metal-doped nanotube-shaped powder prepared in accordance with a preferred embodiment of the present invention at about 150° C. for 12 hours.
Figure 6:
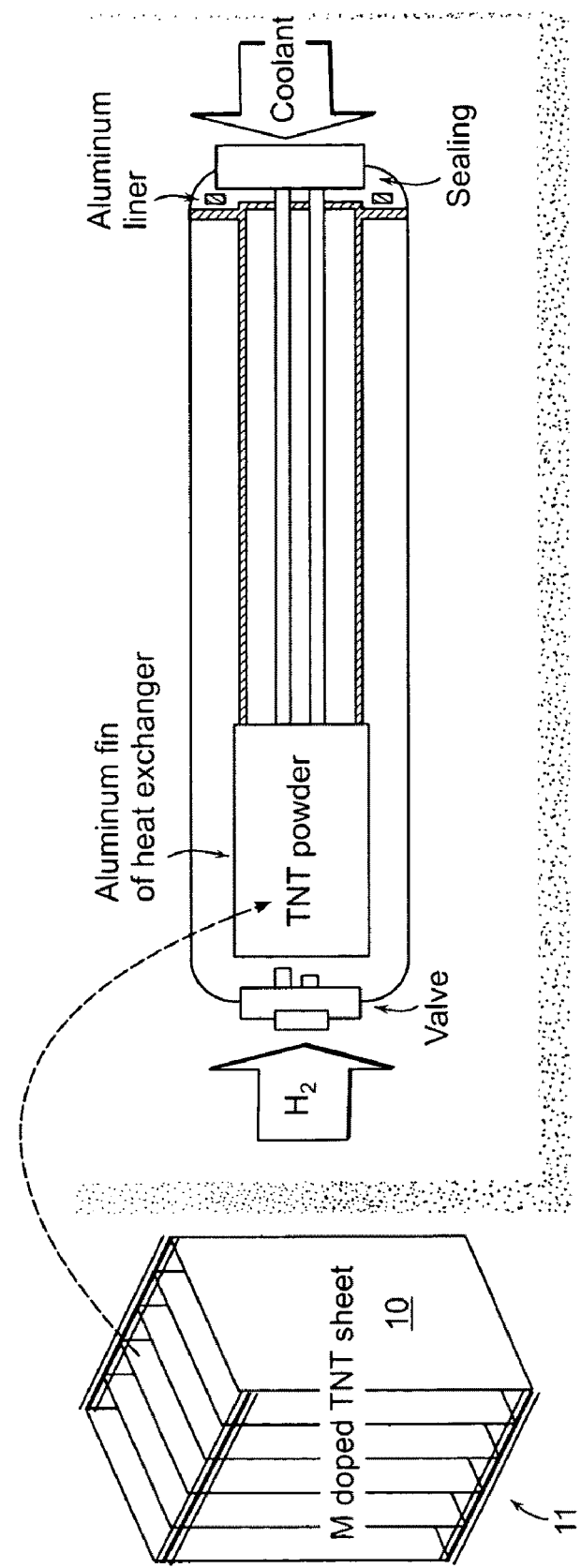
FIG. 6 is a diagram showing a structure in which a sheet film formed of titanate nanotube-shaped powder in accordance with a preferred embodiment of the present invention is inserted into a high pressure hydrogen storage tank.

FIG. 4 is a graph showing the hydrogen storage capacities with respect to pressures, and FIG. 5 is a graph showing the experimental results of hydrogen storage after drying the transition-metal-doped nanotubes prepared in accordance with the preferred embodiment of the present invention at about 150° C. for 12 hours.

As shown in FIG. 4, it can be understood that the Ni-doped titanate nanotube-shaped powder according to the present invention has a hydrogen storage capacity higher than that of the titanate nanotubes and Toyota's Ti—Cr—Mn and that the fired Ni-doped TNT-shaped powder has excellent hydrogen storage capacity.

According to the conventional techniques, a hydrogen storage alloy, i.e., a metal hydride, is inserted into a high pressure hydrogen storage tank to increase the hydrogen storage capacity; unlike the conventional techniques, according to the present invention, the nanotube-shaped powder formed in the above-described methods is mixed with a binder (e.g., Teflon) and compressed to form a sheet film so as to increase the surface area for hydrogen reaction, thus maximizing the hydrogen storage capacity.

As described above, according to the method of manufacturing Ni-doped TiO$_2$ nanotube-shaped powder and the method of manufacturing a sheet film to be inserted into a high-pressure hydrogen tank for a fuel cell vehicle using the Ni-doped TiO$_2$ nanotube-shaped powder, the following advantageous effects are obtained.

It should be recognized that the only alternative energy capable of simultaneously solving the problems of the global environmental contamination, the exhaustion of energy resources and the local distribution of energy is hydrogen energy, and that hydrogen energy technologies will be an important factor determining the international competitiveness in the 21th century.

To realize a hydrogen energy society, a hydrogen storage technology is necessarily required. The reason for this is that it is one of the important technologies for connecting hydrogen production to utilization and building an effective energy system.

In the case where the Ni-doped TiO$_2$ nanotubes are uses as a hydrogen storage material, the process of inserting and separating hydrogen is simplified compared with the existing liquid hydrogen storage method and, since a greater amount of hydrogen can be stored with a small amount of nanotubes, the cost can be significantly reduced compared with the existing hydrogen storage method.

Moreover, it is expected that the hydrogen storage technology can be effectively used in storing hydrogen for a fuel cell vehicle, and used in a dye sensitized solar cell to be applied to a solar electric vehicle and a solar cell, thus significantly increasing the life span of electrodes.

Furthermore, with a photoelectrochemical hydrogen production, which generates hydrogen by water decomposition using the TiO$_2$ nanotubes, it can contribute to ultra-clean energy production.

With the high oil prices and the regulations for greenhouse gas emission reduction, clean technologies are being developed around the world. The governments of advanced countries such as the United States of America, EU, Japan, etc. and the leading companies have accelerated the development of energy materials such as hydrogen, fuel cell, biomass, solar light, secondary battery, and the like.

Accordingly, it is expected that the development of the TiO$_2$ nanotubes will play a very important role in achieving the goals such as development of a next generation energy material, energy security, solution of environmental problems, and securing economic efficiency at the same time.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing Ni-doped $TiO_2$ nanotube-shaped powder, the method comprising the steps of:

forming Ni-doped $TiO_2$ nanotube-shaped powder using Ni-doped $TiO_2$ powder as a starting material; and drying the Ni-doped $TiO_2$ nanotube-shaped powder at 60 to 200° C. for 2 to 24 hours, wherein the step of forming Ni-doped $TiO_2$ nanotube-shaped powder comprises the steps of:

adding the Ni-doped $TiO_2$ powder to a NaOH solution;

heat treating the NaOH mixture in an autoclave at 120 to 180° C. for 24 to 72 hours;

washing the resultant with an HCl solution and distilled water; and collecting Ni-doped $TiO_2$ nanotube-shaped powder.

2. The method of claim 1, wherein the Ni-doped $TiO_2$ powder is formed by adding nickel in the range of 1 to 8 wt % to titanium hydroxide to be mixed with each other.

3. A method of manufacturing a sheet film for use in a high pressure hydrogen storage tank for a fuel cell vehicle, the method comprising the steps of:

mixing the Ni-doped $TiO_2$ nanotube-shaped powder of claim 1 with a binder; and compressing the Ni-doped $TiO_2$ nanotube-shaped powder mixed with the binder to form a sheet film.

4. A method of manufacturing Ni-doped $TiO_2$ nanotube-shaped powder, the method comprising the steps of:

forming Ni-doped $TiO_2$ nanotube-shaped powder using Ni-doped $TiO_2$ powder as a starting material; and drying the Ni-doped $TiO_2$ nanotube-shaped powder, wherein the step of forming Ni-doped $TiO_2$ nanotube-shaped powder comprises the steps of:

adding the Ni-doped $TiO_2$ powder to a NaOH solution;

heat treating the NaOH mixture;

washing the resultant with an acid; and collecting Ni-doped $TiO_2$ nanotube-shaped powder.

5. The method of claim 4, wherein the Ni-doped $TiO_2$ powder is formed by adding nickel in the range of 1 to 8 wt % to titanium hydroxide to be mixed with each other.

* * * * *